US005916052A

United States Patent [19]
Dick

[11] Patent Number: 5,916,052

[45] **Date of Patent: *Jun. 29, 1999**

[54] HYDROMECHANICAL SYSTEM FOR LIMITING DIFFERENTIAL SPEED BETWEEN DIFFERENTIALLY ROTATING MEMBERS

[75] Inventor: Joseph A. Dick, Fort Wayne, Ind.

[73] Assignee: Dana Corporation, Toledo, Ohio

[ * ] Notice: This patent is subject to a terminal disclaimer.

[21] Appl. No.: 08/910,303

[22] Filed: Aug. 11, 1997

Related U.S. Application Data

[63] Continuation of application No. 08/430,503, Apr. 28, 1995, Pat. No. 5,655,983.

[51] Int. Cl.[6] .................................................. B60K 17/35

[52] U.S. Cl. .......................... 475/198; 475/88; 475/220; 475/249; 180/248

[58] Field of Search ................................ 475/88, 80, 83, 475/84, 160, 198, 204, 207, 220, 221, 248, 249; 180/247, 248

[56] References Cited

U.S. PATENT DOCUMENTS

| | | | |
|---|---|---|---|
| 3,657,935 | 4/1972 | O'Brien . | |
| 3,748,928 | 7/1973 | Shiber . | |
| 3,894,446 | 7/1975 | Snoy et al. . | |
| 3,990,327 | 11/1976 | Margolin . | |
| 4,012,968 | 3/1977 | Kelbel . | |
| 4,353,269 | 10/1982 | Hiersig . | |
| 4,677,873 | 7/1987 | Eastman et al. | 475/204 |
| 4,727,966 | 3/1988 | Hiramatsu et al. . | |
| 4,730,514 | 3/1988 | Shikata et al. . | |
| 4,743,180 | 5/1988 | Sickenger . | |
| 4,781,078 | 11/1988 | Blessing et al. . | |
| 5,217,416 | 6/1993 | Dick . | |
| 5,310,388 | 5/1994 | Okeuoglu et al. . | |
| 5,320,586 | 6/1994 | Baxter, Jr. . | |
| 5,334,116 | 8/1994 | Baxter, Jr. | 475/204 |
| 5,494,421 | 2/1996 | Wada et al. . | |
| 5,501,585 | 3/1996 | Ogawa et al. . | |
| 5,536,215 | 7/1996 | Shaffer et al. . | |

(List continued on next page.)

FOREIGN PATENT DOCUMENTS

WO 93/19310 9/1993 WIPO .

*Primary Examiner*—Dirk Wright
*Assistant Examiner*—Peter T. Kwon
*Attorney, Agent, or Firm*—Oldham & Oldham Co., L.P.A.

[57] ABSTRACT

The invention provides a hydromechanical system for limiting differential speed between first and second rotating members of a vehicle drivetrain subassembly. The hydromechanical system comprises a casing disposed within a housing of the subassembly which is rotatably coupled to the first rotating member of the drivetrain subassembly. Hydraulic fluid is supplied from a sump within the drivetrain subassembly housing to a reversible hydraulic pump disposed within the casing, wherein the reversible hydraulic pump pumps hydraulic fluid in response to relative rotation between the first and second rotating members. A piston assembly is disposed within the casing which includes a guide member, an actuating member and a chamber disposed therebetween, wherein the chamber receives the pumped hydraulic fluid. The system further includes a clutch having first and second sets of plates which are rotatably coupled to the first and second rotating members, respectively, wherein individual plates of the first and second sets are disposed in axially alternating relationship with one another. At least one restricted vent passage extends through the actuating member of the piston for venting the hydraulic fluid from the piston chamber to the housing sump when the pressure of the hydraulic flow is below a predetermined pressure. A spring element resiliently separates the actuating member and the clutch until the pressure of the hydraulic fluid reaches the predetermined pressure whereby the actuating member is urged against the clutch which closes the vent passage causing the actuating member to compress the clutch so as to rotatably couple the first and second rotating members of the drivetrain subassembly to one another.

19 Claims, 4 Drawing Sheets

U.S. PATENT DOCUMENTS 5,651,749 7/1997 Wilson et al. .................... 475/220 X
5,655,983 8/1997 Dick .................................... 475/88
5,697,861 12/1997 Wilson ................................ 475/198
5,702,319 12/1997 Baxter, Jr. ........................... 475/84 X
5,704,863 1/1998 Zalewski et al. .................. 180/247 X
5,704,867 1/1998 Bowen .................................. 475/221
5,720,688 2/1998 Wilson et al. .................... 475/198 X
5,725,453 3/1998 Zalewski et al. .................. 180/248 X
5,738,604 4/1998 Dick .................................... 475/206

HYDROMECHANICAL SYSTEM FOR LIMITING DIFFERENTIAL SPEED BETWEEN DIFFERENTIALLY ROTATING MEMBERS

This is a continuation of application Ser. No. 08/430,503 filed on Apr. 28, 1995, now U.S. Pat. No. 5,655,983.

BACKGROUND OF THE INVENTION

The present invention relates generally to a hydromechanical system for limiting differential speed between differentially rotating members, such as in a vehicle drivetrain.

Known hydromechanical mechanisms have utilized hydraulic pumps which pump fluid in response to relative rotation between two rotating members for purposes of rotatably coupling the two rotating members. These systems generally include a hydraulic pump coupled to the two differentially rotating members, which in turn feeds a hydraulically actuated piston. The piston in turn acts on a clutch assembly connecting the two rotating members. The hydraulic pump provides volumetric flow of fluid that varies in direct proportion to the relative or differential rotational speeds of the rotating members. Generally, the hydraulic piston is equipped with an outlet orifice that restricts the outflow of fluid from the piston in order to generate a back pressure of fluid, which drives the piston to engage the clutch mechanism. Such systems therefore provide a capacity for torque transfer between the rotating members that varies in direct proportion to the relative or differential speed between the two shafts.

Accordingly, hydromechanical systems of the type described above require continuous relative rotation between the two members to produce torque transfer. This continuous rotation can produce undesirable levels of torque transfer at small differential rotational speeds. Such systems further do not have the capacity to arrest relative rotation between the members should the differential rotational speed exceed a desired or prespecified limit.

In vehicle drivetrains as an example, it is often desirable to limit differential speed between differentially rotating shafts. For example, four-wheel drive vehicles are becoming common, providing increased traction and safer operation of the vehicle. The four-wheel drive vehicle conventionally employs front and rear drive axles, having a front and rear differentials respectively for driving each wheel of the vehicle. A torque transfer case is generally used to distribute torque to the front and rear drive axles, and may be provided with an interaxle differential for dividing torque in a desired ratio. A selectively engagable clutch has been used to limit differential rotation between the front and rear axles of the vehicle, the clutch being operative to lock the interaxle differential upon sensing a predetermined differential rotation between front and rear output shafts of the transfer case. Activation of the clutch may be controlled by an electronic control system and associated speed sensors measuring speeds of the front and rear output shafts of the transfer case. It is also desirable to limit differential speed between other differentially rotating members in a vehicle drivetrain, such as in a differential associated with a drive axle of a vehicle. While an electronic control system can again be useful to limit differential speed between the differentially rotating members, in these examples as well as others, a simplified and less costly mechanical system, retaining advantages of this type of control system would be desirable.

As the need exists for systems capable of limiting relative rotational speed between two driveline components or other differentially rotating members, the present invention addresses this need without electronically controlled and actuated devices, in the form of an autonomous hydromechanical system which overcomes the problems of known hydromechanical mechanisms. The invention satisfies a need for a cost-effective system for limiting differential rotation between differentially rotating members.

SUMMARY OF THE INVENTION

The present invention is therefore directed to a passive autonomous hydromechanical system for limiting differential speed between two rotating members, such as two rotating shafts in a vehicle drivetrain. The hydromechanical system generally comprises a reversible hydraulic pump disposed within a rotating housing, with means for supplying hydraulic fluid from a sump to the rotating housing. The pump is coupled to the differentially rotating members, and hydraulic fluid is pumped in response to their relative rotation thereby. The hydraulic fluid is supplied to a piston assembly disposed within the casing, and flows out through at least one or more restricted vent passages disposed in the piston, thereby resulting in a build-up of pressure in the piston assembly. In the preferred embodiment, the piston assembly is utilized to engage a clutch assembly, but is restrained from engaging the clutch assembly by a spring, until sufficient fluid pressure in the piston assembly overcomes the restraining force provided by the spring. Upon attaining sufficient fluid pressure, the piston moves into engagement with the clutch assembly and in turn closes the restricted vent passages, causing pressure in the piston assembly to build rapidly. The force provided by the piston assembly actuates the clutch and has the capacity to arrest the relative rotation between the two rotating members. Also in the preferred embodiment, an additional vent or vents associated with the piston assembly allow gradual pressure dissipation and subsequently results in the spring acting to disengage the piston from the clutch assembly, again allowing differential rotation between the two rotating members.

According to the above, it is a main object of the invention to provide a hydromechanical system that has the capacity to arrest relative rotation between the differentially rotating members should the relative rotational speed between the members exceed a desired or prespecified limit. The hydromechanical system does not require continuous relative rotation between the rotating members in order to produce torque transfer, nor does it produce undesirable levels of torque transfer at low relative rotational speeds.

DETAILED DESCRIPTION OF THE INVENTION

A first embodiment of the hydromechanical system 20 according to the invention is shown more distinctly in FIGS.

Figure 1:
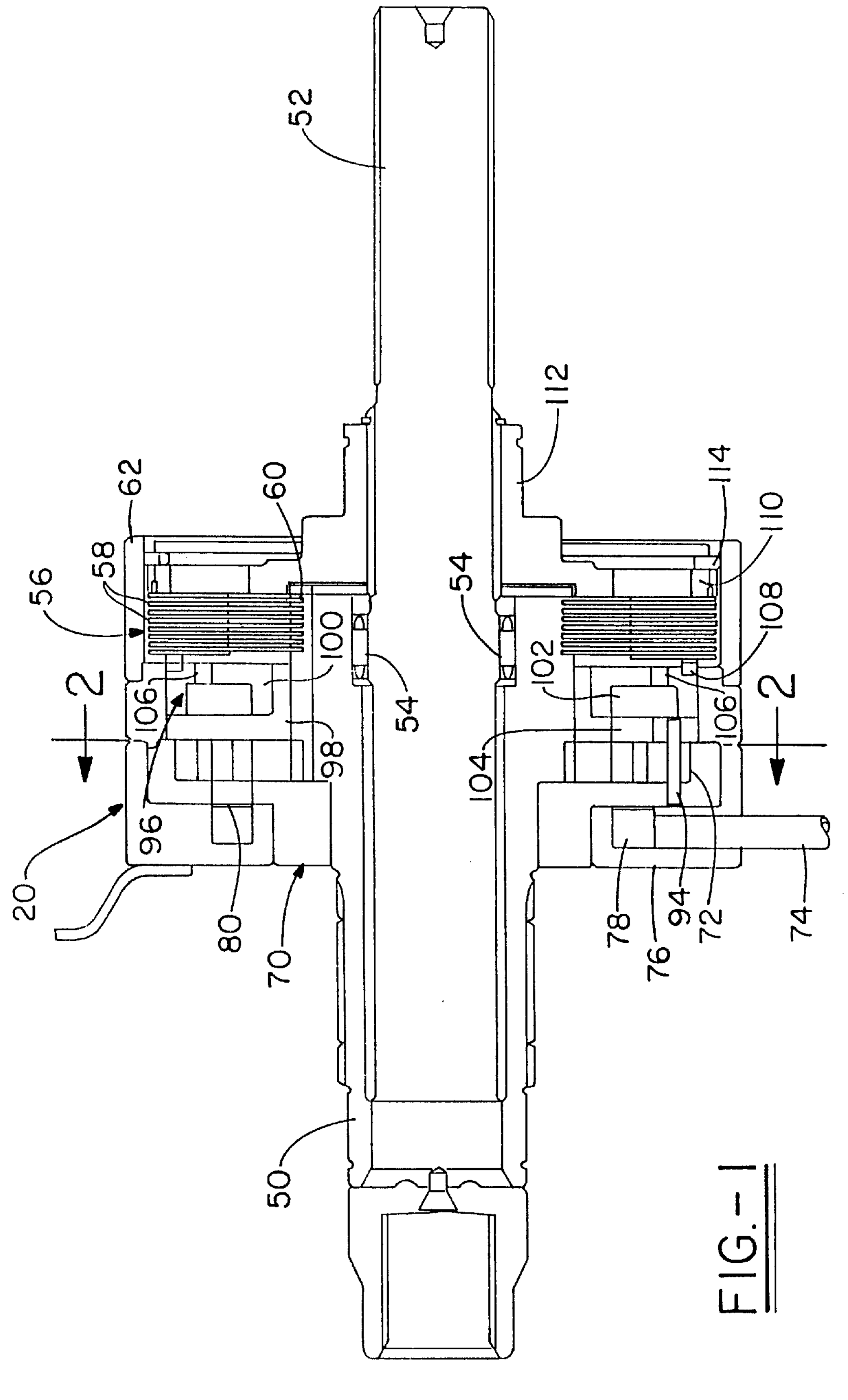
FIG. 1 is a generally schematic cross-sectional view illustrating the hydromechanical system of the invention.

1 and 2. FIG. 1 shows a simplified cross-sectional view of a driveline system having two differentially rotating shafts, including a first rotating shaft 50 and a second rotating shaft 52. The shafts 50 and 52 are differentially driven and rotatable relative to one another, with shaft 52 being supported by bearings 54 relative to shaft 50. Shafts 50 and 52 are selectively coupled together for rotation with one another by means of the differential speed limiting clutch generally indicated at 56. Clutch 56 includes interleaved clutch plates 58 and 60, with plates 58 splined to rotate with a housing 62. The housing 62 in turn is splined to shaft 52 for rotation therewith. Similarly, clutch plates 60 are splined for rotation with the shaft 50, such that upon actuation of clutch 56, differential rotation between shafts 50 and 52 will be arrested. The hydromechanical system 20 of the invention is used to selectively actuate the clutch 56 upon the occurrence of a predetermined differential rotation between shafts 50 and 52. Hydromechanical system 20 includes a casing 70 coupled for rotation with shaft 50. Within the rotating housing 70, a reversible hydraulic pump 72 is disposed. In the preferred embodiment, the hydraulic pump 72 is a reversible gerotor pump. For operation, means to supply hydraulic fluid to the rotating housing 70 are provided, such as a hydraulic fluid supply line 74 connected to a hydraulic fluid sump, and coupled to an intake manifold 76. Hydraulic fluid is supplied to a plenum 78 within manifold 76, and to pump 72 via a passage 80 in casing 70 to the inlet of pump 72.

Figure 2A:
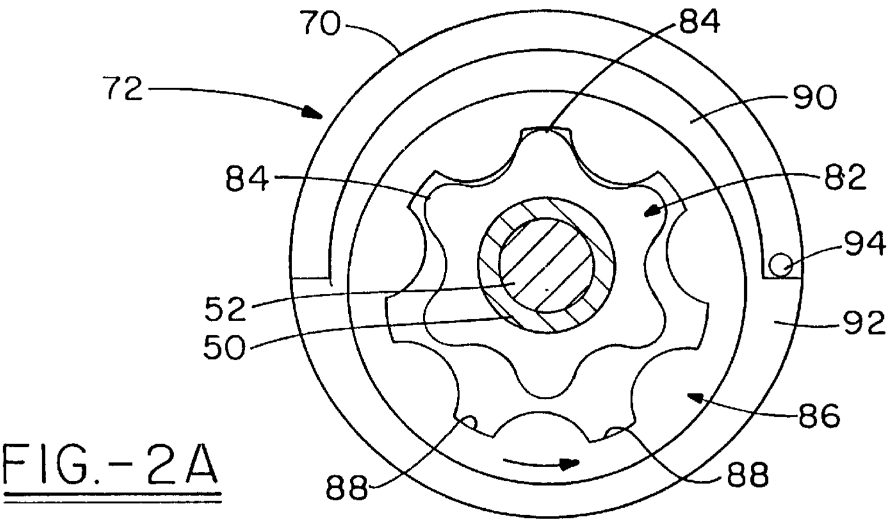
FIG. 2A is a view taken along line 2—2 of FIG. 1, illustrating the reversible hydraulic pump in a first position.
Figure 2B:
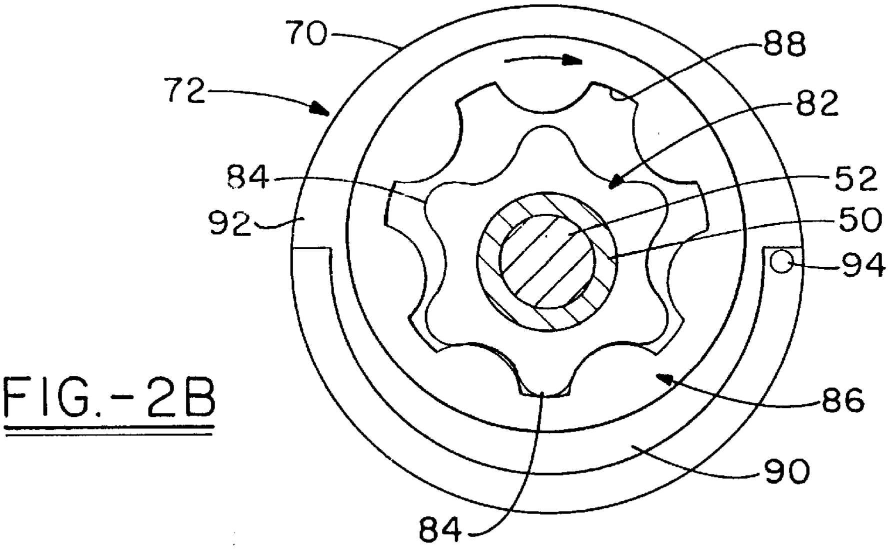
FIG. 2B is a view taken along line 2—2 in FIG. 1, illustrating the reversible hydraulic pump in a second position.

As best seen in FIGS. 2A and 2B, pump 72 comprises an inner rotor 82 having a plurality of external teeth 84. Inner rotor 82 is drivingly connected to rotating shaft member 50. The reversible gerotor pump 72 also includes an outer rotor or impeller 86 having a plurality of internal teeth 88 which are in meshing engagement with external teeth 84 of inner rotor or impeller 82. In general, the inner rotor 82 has one less tooth than the outer rotor 86, such that driving of the inner rotor 82 will in turn cause driving of the outer rotor 86 which is free to rotate within an outer eccentric ring 90. Relative rotation of the inner rotor 82 to the outer rotor 86 thus provides a series of variable volume chambers within pump 72, resulting in the build up of fluid pressure and pumping of hydraulic fluid in response to relative rotation of the rotors 82 and 86, and thus in response to differential rotation between shafts 50 and 52. The eccentric ring 90 includes a flange 92 extending approximately 180 degrees around the periphery of ring 90, which cooperates with a stop pin 94 supported on casing 70. The pump 72 is reversible, such that hydraulic fluid is pumped in response to differential rotation between shafts 50 and 52 in either direction. In FIG. 2A, the pump is shown rotating in the direction of the arrow, such that rotation of ring 92 is stopped by stop pin 94, and the external teeth 84 of inner rotor 82 meshingly engaged with the internal teeth 88 of outer rotor 86 at a top portion of the eccentric bore provided in ring 90. If the differential rotation of the shafts 50 and 52 is reversed, the outer ring 90 will rotate approximately 180 degrees, with stop pin 94 contacting flange 92 to stop rotation of ring 90. As shown in FIG. 2B, the eccentric bore in ring 90 is thus moved such that the external teeth 84 of inner rotor 82 meshingly engaged with internal teeth 88 of outer rotor 86 at a bottom portion thereof, with pumping capacity maintained. Thus, pump 72 pumps hydraulic fluid in response to relative rotation between shafts 50 and 52 regardless of the relative rotation between these shafts.

To provide sufficient pumping capacity to allow the reversible hydraulic pump 72 to arrest differential rotation between the rotating shafts 50 and 52, the preferred embodiment provides inner rotor 82 and outer rotor 86 with seven teeth. Other arrangements are contemplated to provide proper pumping capacity for the desired application.

The hydromechanical system 20 further includes an annular piston 96 which is disposed within casing 70 and includes a guide member 98 and an actuating member 100 which slidingly engages guide member 98. Piston 96 further includes a chamber 102 which is disposed between guide member 98 and actuating member 100 and receives the hydraulic fluid pumped from pump 72 via supply passage 104 formed in guide member 98. Guide member 98 also provides support for stop pin 94. The actuating member 100 of piston 96 also includes at least one restricted vent passage 106 and may comprise a plurality of vent passages 106 as shown in FIG. 2. Each vent passage 106 extends through piston actuating member 100 and is in flow communication with piston chamber 102. Also acting on piston actuating member 100 is an annular spring element 108 disposed between piston actuating member 100 and clutch 56. The spring member 108 is an overcentering spring, such as a “finger washer” or wave spring, and restrains piston actuating member 100 from engagement with the clutch 56 until a predetermined actuating pressure is achieved which overcomes the restraining force of spring 108 and allows engagement of actuating member 100 with the clutch 56.

As previously indicated, this predetermined threshold may be set or tuned to a predetermined differential rotation between shafts 50 and 52, with the reversible hydraulic pump 72 providing pumping pressure corresponding to such differential rotation to actuate piston 96. The pressure of the hydraulic fluid supplied to chamber 102 from pump 72 provides hydraulic force to actuate piston actuating member 100 upon reaching a predetermined differential rotation between shafts 50 and 52 which is sufficient to overcome the resisting force applied by spring 108. Accordingly, actuating member 100 is urged against clutch 56, which will in turn substantially close the vent passages 106. At this time, the hydraulic pressure in chamber 102 will increase very quickly in response to relative rotation between shafts 50 and 52, causing actuating member 100 to compress clutch plates 58 and 60 into frictional engagement with one another. Pressure within the chamber 102 continues to build until sufficient clutching is attained to stop or arrest all differential rotation between shafts 50 and 52. The cooperation between the hydraulic pump 72 which provides a predetermined fluid pressure in response to differential rotation between shafts 50 and 52 to actuate the piston 96, and the spring member 108 providing a restraining force on piston actuating member 100, are thus set to actuate the clutch 56 upon reaching a predetermined differential rotation between shafts 50 and 52. The spring element 108 as previously indicated, may be an overcentering type spring providing a nonlinear spring constant which exhibits nonlinear load versus deflection characteristics. Alternatively, spring 108 may be a coil spring or similar type having a linear spring constant exhibiting linear load versus deflection characteristics. The choice of the type of spring element 108 is dependent upon the desired spring characteristic for particular application, and again allows tuning of the hydromechanical system 20 to perform in a desired manner for a particular application.

As seen in FIG. 1, there is also provided a reaction disc 110 disposed on the opposite side of clutch pack 56 from the piston 96, including a portion 112 which is splined to shaft 52 for rotation therewith. Accordingly, when actuating member 100 of piston 96 applies an axial force to clutch 56, plates 58 and 60 will be urged into frictional engagement with one another, and the load applied to clutch 96 is transferred to reaction disc 110 and correspondingly locks shafts 50 and 52 together. A snap ring 114 is secured to member 62 to maintain reaction disc 110 in proper abutting relationship to the clutch 56.

Figure 3:
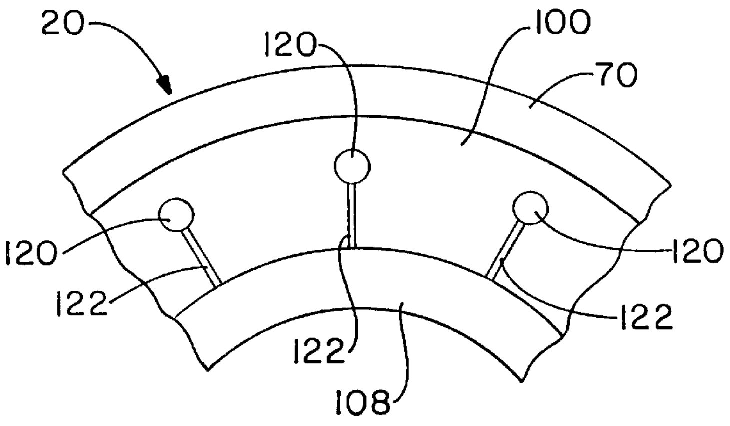
FIG. 3 shows an alternate embodiment of the hydromechanical system according to the invention.

Subsequent to actuation of the clutch 56, deactuation is accomplished within a predetermined amount of time subsequent to locking rotation of shafts 50 and 52 together should normal driving conditions prevail. Unloading of clutch 56 may be accomplished by simply allowing hydraulic fluid to bleed from piston chamber 102 by means of machining intolerances formed in the components of the piston assembly 96 as an example. Machining intolerances may be specifically accepted to form gaps between the components of the piston assembly 96 in relation to clutch 56, with leakage of hydraulic fluid reducing hydraulic pressure to allow the clutch pack to slip after a predetermined time from actuation. Alternatively, as shown in FIG. 3, one or more additional bleed passages 120 may be formed through the piston actuating member 100 which communicate with bleed channels 122 formed on the outside of actuating member 100 adjacent clutch pack 56. Bleed passages 120 and bleed channels 122 provide restricted passage of hydraulic fluid from the piston chamber 102 to slowly bleed off hydraulic pressure established in the piston assembly 96 upon actuating clutch 56 in a desired manner. Other suitable arrangements to allow a predetermined reduction in hydraulic fluid pressure for deactuation of clutch 56 are contemplated in the invention.

Figure 4:
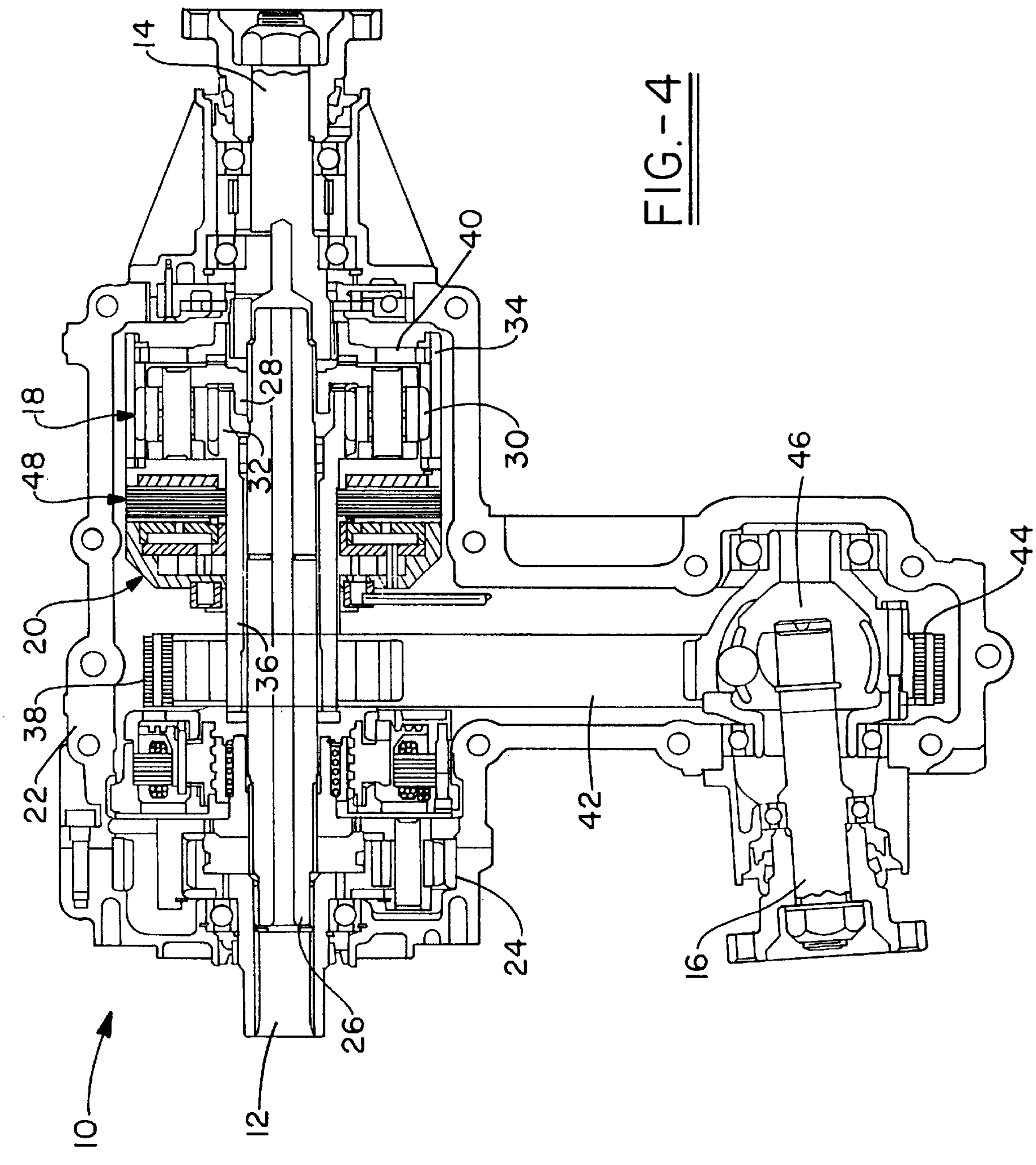
FIG. 4 is a cross-sectional view of a torque transfer case incorporating the hydromechanical system of the invention.

In FIG. 4, the hydromechanical system of the invention is incorporated into a torque transfer case 10. The transfer case 10 is merely an example of a vehicle drivetrain subassembly in which the hydromechanical system of the invention may be useful. The torque transfer case 10 may be used in a four-wheel drive vehicle, for example, and includes an input shaft 12, which receives torque from an engine and transmission assembly (not shown) of the vehicle. A rear output shaft 14 and a front output shaft 16 are connected to the rear and front drive shafts (not shown) of the vehicle to provide drive power thereto. An interaxle planetary gear differential generally indicated as 18 may be used to divide torque from input shaft 12 between the rear output shaft 14 and front output shaft 16. Associated with the interaxle differential 18, the hydromechanical system for limiting differential speed between rotating members in the transfer case 10 is generally shown at 20. In this example, the hydromechanical system 20 does not inhibit differentiation between the output shaft 14 and 16 during normal vehicle operation; such as during cornering where differentiation between the output shafts 14 and 16 is required. The hydromechanical system 20 limits the allowable differential speed between the rear output shaft 14 and front output shaft 16 to avoid excessive slippage between output shafts 14 and 16. Excessive slipping may occur between these output shafts when a front or rear wheel of the vehicle engages a surface having a low coefficient of friction, for example. The hydromechanical system 20 of the invention has the capacity to arrest relative rotation between the output shafts 14 and 16 should relative rotational speed exceed a predetermined or prespecified limit. The hydromechanical system 20 also provides a mechanism by which torque may be transferred to a non-slipping axle upon the occurrence of predetermined differential rotation between the output shafts 14 and 16. The hydromechanical system 20 also provides these desired functions without requiring continuous relative rotation between the output shafts, and without producing any undesirable torque transfer at relative rotational speeds below the prespecified limit.

The torque transfer case 10 shown in FIG. 4 is merely an example of a known torque transfer case, and the hydromechanical system 20 of the invention may be used with the variety of other known torque transfer cases, or wherever it is desired to limit differential rotation between two rotating members. As shown in FIG. 4, the input shaft 12 may be rotatably supported within a housing 22. Although not a part of the invention, the input shaft 12 may be coupled through a planetary gear set 24 to an intermediate shaft 26 rotatably supported within housing 22. The planetary gear set 24 may provide low and high speed ranges in operation of the transfer case 10. The intermediate shaft 26 is coupled to and drives the planet carrier 28 of the interaxle planetary gear differential 18. Planet carrier 28 carries a plurality of circumferentially spaced and individually rotatable planet gears 30. Each of the planet gears 30 meshingly engages with the sun gear 32 and ring gear 34 of the planetary gear differential 18. The sun gear 32 may be provided on a sleeve 36 rotatably mounted about intermediate shaft 26. The sleeve 36 may in turn carry a drive sprocket 38. The ring gear 34 of the planetary gear differential 18 is drivingly connected to a link gear 40, which in turn is drivingly coupled to the rear output shaft 14 to provide driving torque thereto. In this arrangement of the example of torque transfer case 10, the torque is transmitted from the vehicle engine and transmission to the input shaft 12 and through the planetary gear set 24 to the intermediate shaft 26. The intermediate shaft 26 in turn drives the planet carrier 28 associated with the interaxle planetary gear differential, transmitting torque to the sun gear 32 and ring gear 34 thereof. Driving torque is transmitted from the ring gear 34 to the rear output shaft 14, and through the sun gear 32 to drive sleeve 36 and the drive sprocket 38 associated therewith. The drive sprocket 38 is connected to a drive chain 42 to drive a second sprocket 44. Torque is transferred from the drive sprocket 44 to the front output shaft 16 through a CV universal joint generally indicated at 46.

As part of the hydromechanical system 20 according to the invention, a differential speed limiting clutch 48 is provided to selectively lock ring gear 34 and sleeve 36 into rotation with one another, thereby arresting relative rotation between these members, and correspondingly between the rear output shaft 14 and front output shaft 16. The hydromechanical system 20 is used to actuate the differential speed limiting clutch 48 if the relative rotational speed between these members exceeds a desired or prespecified limit. The hydromechanical system 20 is autonomous, or self-controlled with the ability to tune or program the system to set the desired or prespecified limit according to desired driving conditions.

Figure 5:
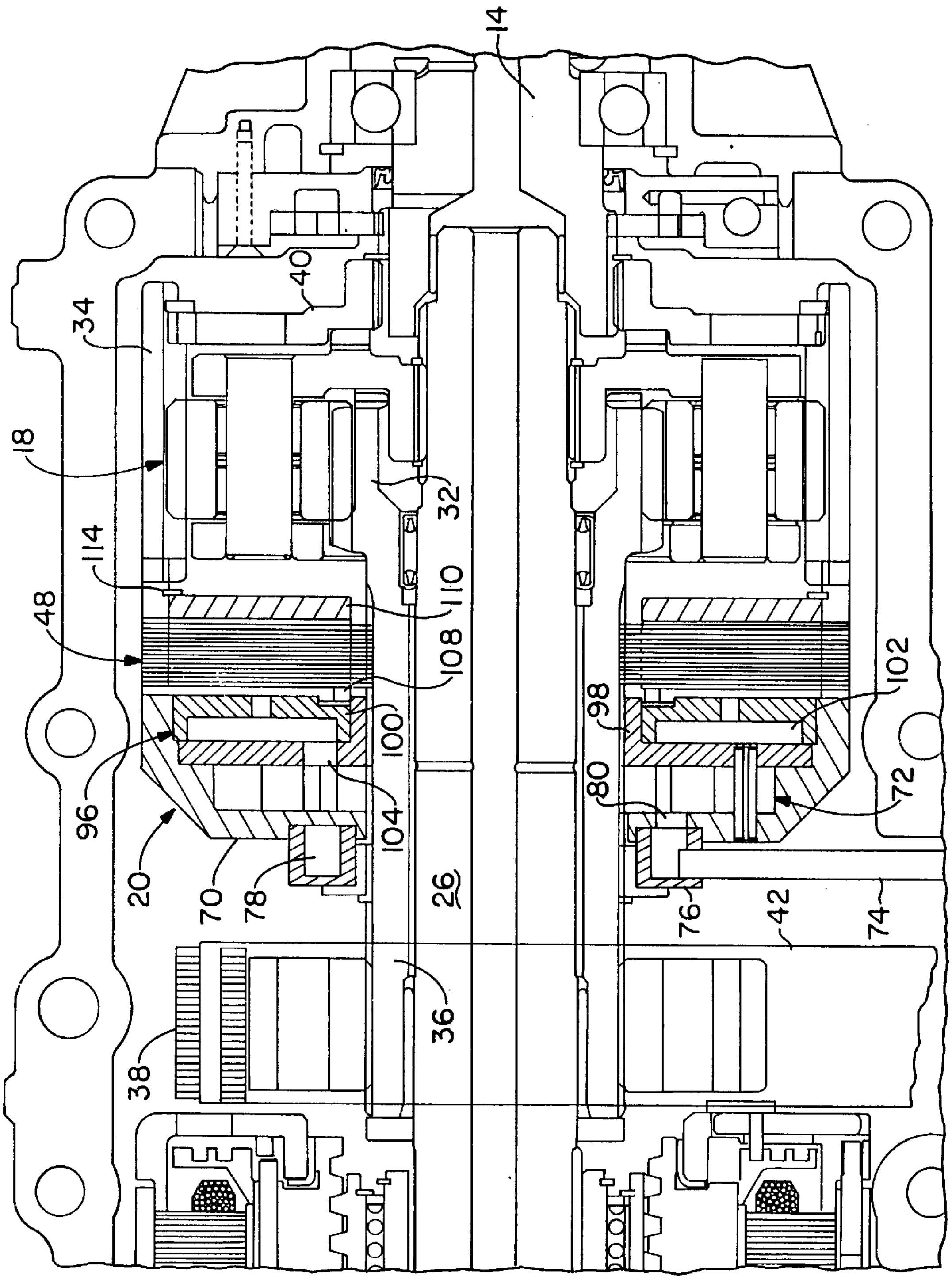
FIG. 5 is an enlarged, partial cross-sectional view of the hydromechanical system illustrated in FIG. 1.

FIG. 5 shows an enlarged view of the interaxle planetary gear differential 18 which divides torque between front and rear axles of the four-wheel drive vehicle. As previously described, input torque is supplied via shaft 26, and is distributed to a rear output shaft 14 and sun gear 32 along with corresponding sleeve 36 via differential 18. The sleeve 36 supplies torque to a drive sprocket 38 and drive chain 42 connected to a front output shaft 16 (shown in FIG. 4). The hydromechanical system 20 is disposed within the transfer case housing, and housing 70 is coupled for rotation with ring gear 34, which in turn is coupled to the rear output shaft 14 through link gear 40. The reversible hydraulic pump 72 has the outer eccentric ring 92 and outer rotor 86 coupled to housing 70 for rotation therewith, and thus for rotation with output shaft 14. The inner rotor 82 is coupled for rotation with sleeve 36, and thus with front output shaft 16 (not shown). During normal driving conditions where there is no relative rotation between the front output shaft 16 and rear output shaft 14 of the torque transfer case 10, such as when the vehicle is traveling straight down a roadway, the hydraulic pump 72 does not operate to pump hydraulic fluid, and piston 96 does not actuate the differential speed limiting clutch 48 forming a part of the interaxle planetary gear differential 18. Similarly, during normal turning of the vehicle, differentiation is required between front and rear output shafts 14 and 16 up to a maximum steer angle, and hydromechanical system 20 allows such differential rotation without actuating clutch 48. During turning, although differential rotation will cause hydraulic pump 72 to pump fluid in response thereto, the restraining force of spring member 108 prevents actuation of clutch 48. Accordingly, during normal driving conditions, virtually no axial force is applied to clutch 48, allowing planetary gear differential 18 to perform in a normal manner. On the other hand, when pumped hydraulic fluid from hydraulic pump 72 reaches a predetermined pressure, corresponding to a given unacceptable magnitude of differential rotation between front and rear output shafts 16 and 14 respectively, the force exerted by the hydraulic pressure on actuating member 100 of piston 96 overcomes the restraining force of spring 108 to urge actuating member 100 against clutch pack 48. When this occurs, the vent passages 106 are closed as previously described, and hydraulic pressure increases rapidly to actuate clutch 48. Actuation of clutch 48 locks the planetary differential 18, and rotatably couples ring gear 34 and sun gear 32 to one another, not allowing differentiation between output shafts 14 and 16. After actuation of clutch 48, it is then desirable to deactuate clutch 48 and again allow differentiation between output shafts 14 and 16. Thus, after a relatively short period of time, which may comprise a few seconds, clutch 48 is unloaded by bleeding hydraulic fluid contained within piston chamber 102 in the manner described previously.

In this way, the hydromechanical system 20 of the invention selectively couples the first and second rotating members in the transfer case 10 to one another to eliminate differentiation therebetween, while avoiding any limitation to differentiation required during normal vehicle driving conditions. The hydromechanical system 20 has the capacity to arrest relative rotation should the relative rotational speed between the two rotating members of the vehicle drivetrain exceed a predetermined limit, thereby providing an autonomous mechanical mechanism for limiting relative rotational speed between two driveline components. The hydromechanical system 20 is self-contained and exerts negligible force below the predetermined differential rotational speed and then quickly provides a force sufficient to arrest differential rotation between the members once this predetermined limit is met.

The hydromechanical system 20 of the invention may also be used in other environments, such as in a vehicle differential to limit differential rotation of output shafts associated with the differential. Again in this environment, the outer wheel of the vehicle must rotate faster than the inner wheel during turning, with the differential gear maintaining equally divided torque distribution to the wheels to secure a smooth turn. On the other hand, if a vehicle wheel is on a low friction surface, a limited slip differential is desirable to transfer torque from the slipping wheel to a non-slipping wheel to improve driving mobility. The hydromechanical system 20 of the present invention allows differential rotation between the output shafts of the differential to be limited according to differential speed between the output shafts, or based upon differential torque supplied to the output shafts.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, the hydromechanical system of the present invention may also be advantageously be utilized in conjunction with other vehicle drivetrain subassemblies. The invention is therefore not limited to specific preferred embodiments as described but is only limited by the following claims.

What is claimed is:

1. A transfer case for a four wheel drive motor vehicle having a hydromechanical system for limiting differential speed between a front output shaft and a rear output shaft, said hydromechanical system comprising:

a sump for supplying hydraulic fluid to a housing, said housing being coupled to one of said front output shaft and said rear output shaft for rotation therewith and having a hydraulic fluid pump disposed therein;

said hydraulic pump being coupled to said front output shaft and said rear output shaft such that hydraulic fluid supplied to said housing is pumped in response to relative rotation between said front output shaft and said rear output shaft;

a piston assembly within said housing having a chamber to which hydraulic fluid is supplied from said hydraulic pump, said hydraulic fluid acting on a movable actuating member;

said actuating member having at least one restricted vent passage formed through said actuating member which allows said hydraulic fluid to selectively flow through said actuating member from said chamber to said sump, with the pumping of said hydraulic fluid to said chamber causing the build-up of pressure in said chamber and movement of said actuating member; and a clutch having first and second clutch plates coupled to said front output shaft and said rear output shaft respectively, said actuating member being movable to engage said clutch upon reaching a predetermined fluid pressure in said chamber, wherein upon engagement with said clutch, said at least one restricted vent passage is substantially closed to limit flow of said hydraulic fluid therethrough from said chamber causing pressure in said chamber to increase to thereby actuate said clutch and limit relative rotation between said front output shaft and said rear output shaft.

2. The transfer case for a four wheel drive motor vehicle having a hydromechanical system for limiting differential speed between a front output shaft and a rear output shaft in accordance with claim 1, wherein:

said hydraulic pump includes an inner rotor rotatably coupled to said rear output shaft for rotation therewith, said inner rotor having a plurality of external teeth;

an outer rotor having a plurality of internal teeth of a number one greater than the number of external teeth of said inner rotor, said internal teeth and said external teeth in meshing engagement with one another; and an eccentric ring surrounding said outer rotor and in frictional engagement with said outer rotor for rotation wherewith, said eccentric ring and said outer rotor rotating with said inner rotor until relative rotation between said housing and said rear output shaft causes said eccentric ring to contact a stop pin supported by said housing thereby causing said eccentric ring and said outer rotor to rotate eccentrically with respect to said inner rotor to pump said hydraulic fluid.

3. The transfer case for a four wheel drive motor vehicle having a hydromechanical system for limiting differential speed between a front output shaft and a rear output shaft in accordance with claim 1, further comprising a spring acting on said actuating member providing a predetermined restraining force on said actuating member to facilitate controlling said predetermined fluid pressure at which said actuating member engages said clutch.

4. The transfer case for a four wheel drive motor vehicle having a hydromechanical system for limiting differential speed between a front output shaft and a rear output shaft in accordance with claim 3, wherein said spring has a predetermined spring constant.

5. The transfer case for a four wheel drive motor vehicle having a hydromechanical system for limiting differential speed between a front output shaft and a rear output shaft in accordance with claim 1, wherein said hydraulic fluid is supplied to said pump by a tube and an intake manifold, said tube having a first end in flow communication with said sump and a second end in flow communication with a plenum contained within said intake manifold, said plenum being in flow communication with said pump, wherein said tube and said intake manifold remain stationary with respect to said sump.

6. The transfer case for a four wheel drive motor vehicle having a hydromechanical system for limiting differential speed between a front output shaft and a rear output shaft in accordance with claim 1, further comprising a load transferring means including a reaction disk, said reaction disk disposed in abutting relationship with said clutch, said clutch being disposed axially between said actuating member and said reaction disk.

7. The transfer case for a four wheel drive motor vehicle having a hydromechanical system for limiting differential speed between a front output shaft and a rear output shaft in accordance with claim 1, wherein said transfer case includes a planetary gear differential having a planet carrier for receiving input torque, on output ring gear and an output sun gear, wherein said housing is rotatably coupled to said front output shaft by said ring gear.

8. The transfer case for a four wheel drive motor vehicle having a hydromechanical system for limiting differential speed between a front output shaft and a rear output shaft in accordance with claim 7, wherein said inner rotor of said hydraulic pump is rotatably coupled to said sun gear.

9. The transfer case for a four wheel drive motor vehicle having a hydromechanical system for limiting differential speed between a front output shaft and a rear output shaft in accordance with claim 8, wherein said ring gear and said sun gear are rotatably coupled when said actuating member actuates said clutch so as to lock said planetary gear set.

10. The transfer case for a four wheel drive motor vehicle having a hydromechanical system for limiting differential speed between a front output shaft and a rear output shaft in accordance with claim 1, further comprising at least one bleed passage being in flow communication with said chamber, wherein said at least one bleed chamber assists in reducing the hydraulic fluid pressure in said chamber after said hydraulic fluid pressure actuates said clutch for purposes of uncoupling said first clutch plate and said second clutch plate.

11. A differential axle for a motor vehicle having a hydromechanical system for limiting differential speed between a right output shaft and a left output shaft, said hydromechanical system comprising:

a sump for supplying hydraulic fluid to a housing, said housing being coupled to one of said right output shaft and said left output shaft for rotation therewith and having a hydraulic fluid pump disposed therein;

said hydraulic pump being coupled to said right output shaft and said left output shaft such that hydraulic fluid supplied to said housing is pumped in response to relative rotation between said right output shaft and said left output shaft;

a piston assembly within said housing having a chamber to which hydraulic fluid is supplied from said hydraulic pump, said hydraulic fluid acting on a movable actuating member;

said actuating member having at least one restricted vent passage formed through said actuating member which allows said hydraulic fluid to selectively flow through said actuating member from said chamber to said sump, with the pumping of said hydraulic fluid to said chamber causing the build-up of pressure in said chamber and movement of said actuating member; and a clutch having first and second clutch plates coupled to said right output shaft and said left output shaft respectively, said actuating member being movable to engage said clutch upon reaching a predetermined fluid pressure in said chamber, wherein upon engagement with said clutch, said at least one restricted vent passage is substantially closed to limit flow of said hydraulic fluid therethrough from said chamber causing pressure in said chamber to increase to thereby actuate said clutch and limit relative rotation between said right output shaft and said left output shaft.

12. The differential axle for a motor vehicle having a hydromechanical system for limiting differential speed between a right output shaft and a left output shaft in accordance with claim 11, wherein:

said hydraulic pump includes an inner rotor rotatably coupled to one of said right output shaft and said left output shaft for rotation therewith, said inner rotor having a plurality of external teeth;

an outer rotor having a plurality of internal teeth of a number one greater than the number of external teeth of said inner rotor, said internal teeth and said external teeth in meshing engagement with one another; and an eccentric ring surrounding said outer rotor and in frictional engagement with said outer rotor for rotation wherewith, said eccentric ring and said outer rotor rotating with said inner rotor until relative rotation between said housing and said left output shaft causes said eccentric ring to contact a stop pin supported by said housing thereby causing said eccentric ring and said outer rotor to rotate eccentrically with respect to said inner rotor to pump said hydraulic fluid.

13. The differential axle for a motor vehicle having a hydromechanical system for limiting differential speed between a right output shaft and a left output shaft in accordance with claim 11, further comprising a spring acting on said actuating member providing a predetermined restraining force on said actuating member to facilitate controlling said predetermined fluid pressure at which said actuating member engages said clutch.

14. The differential axle for a motor vehicle having a hydromechanical system for limiting differential speed between a right output shaft and a left output shaft in accordance with claim 13, wherein said spring has a predetermined spring constant.

15. The differential axle for a motor vehicle having a hydromechanical system for limiting differential speed between a right output shaft and a left output shaft in accordance with claim 11, wherein said hydraulic fluid is supplied to said pump by a tube and an intake manifold, said tube having a first end in flow communication with said sump and a second end in flow communication with a plenum contained within said intake manifold, said plenum being in flow communication with said pump, wherein said tube and said intake manifold remain stationary with respect to said sump.

16. The differential axle for a motor vehicle having a hydromechanical system for limiting differential speed between a right output shaft and a left output shaft in accordance with claim 11, further comprising a load transferring means including a reaction disk, said reaction disk disposed in abutting relationship with said clutch, said clutch being disposed axially between said actuating member and said reaction disk.

17. The differential axle for a motor vehicle having a hydromechanical system for limiting differential speed between a right output shaft and a left output shaft in accordance with claim 11, wherein said differential axle includes a planetary gear differential having a planet carrier for receiving input torque, on output ring gear and an output sun gear, wherein said housing is rotatably coupled to said right output shaft by said ring gear.

18. The differential axle for a motor vehicle having a hydromechanical system for limiting differential speed between a right output shaft and a left output shaft in accordance with claim 17, wherein said inner rotor of said hydraulic pump is rotatably coupled to said sun gear.

19. The differential axle for a motor vehicle having a hydromechanical system for limiting differential speed between a right output shaft and a left output shaft in accordance with claim 18, wherein said ring gear and said sun gear are rotatably coupled when said actuating member actuates said clutch so as to lock said planetary gear set.

* * * * *